(12) United States Patent
Schaefer et al.

(10) Patent No.: US 6,753,383 B2
(45) Date of Patent: Jun. 22, 2004

(54) REMOVAL OF FREE ALDEHYDES

(75) Inventors: Oliver Schaefer, Munich (DE); Juergen Stohrer, Pullach (DE); Wolfgang Doering, Burgkirchen (DE)

(73) Assignee: Consortium fuer Elektrochemische Industrie GmbH, Munich (DE)

( * ) Notice: Subject to any disclaimer, the term of this patent is extended or adjusted under 35 U.S.C. 154(b) by 177 days.

(21) Appl. No.: 10/011,169

(22) Filed: Dec. 6, 2001

(65) Prior Publication Data
US 2002/0123543 A1 Sep. 5, 2002

(30) Foreign Application Priority Data
Dec. 21, 2000 (DE) .......................................... 100 64 085

(51) Int. Cl.$^7$ ................................................ C08J 3/20
(52) U.S. Cl. ................. 525/349; 525/330.4; 525/330.5; 525/385; 525/386; 523/102
(58) Field of Search ............................. 525/349, 330.4, 525/330.5, 385, 386; 523/102

(56) References Cited

U.S. PATENT DOCUMENTS

| | | | |
|---|---|---|---|
| 4,532,947 A | | 8/1985 | Caseley |
| 5,060,672 A | * | 10/1991 | Irimi et al. ................. 131/331 |
| 5,071,902 A | | 12/1991 | Langerbeins et al. |
| 5,143,954 A | | 9/1992 | Hutton et al. |
| 5,206,204 A | | 4/1993 | Tsutsumi et al. |
| 5,326,814 A | | 7/1994 | Biale |
| 5,356,899 A | | 10/1994 | Elbe et al. |
| 5,554,363 A | * | 9/1996 | Nandagiri et al. ....... 424/70.51 |
| 5,585,438 A | | 12/1996 | Esu |
| 5,705,537 A | | 1/1998 | Hartman, Jr. et al. |
| 5,744,418 A | | 4/1998 | Jakob |

FOREIGN PATENT DOCUMENTS

| | | |
|---|---|---|
| AU | 8431608 | 2/1985 |
| DE | 33 28 456 A1 | 2/1985 |
| DE | 198 09 479 A1 | 9/1999 |
| EP | 0 234 464 A1 | 9/1987 |
| EP | 0 277 688 A2 | 8/1988 |
| EP | 0 488 605 A2 | 6/1992 |
| EP | 0 610 892 A1 | 8/1994 |
| EP | 0 778 290 B1 | 7/1999 |
| JP | 1-192612 | 8/1989 |

OTHER PUBLICATIONS

English Derwent Abstract AN 1999–519439 Corresponding To DE 198 09 479.
Patent Abstract of Japan Corresponding To JP 1–192612.
H. Nishikawa et al., "Derivatization and Chromatographic Determination of Aldehydes In Gaseous and Air Samples," Journal of Chromatography A, vol. 710 (1995), pp. 159–165.

* cited by examiner

*Primary Examiner*—David W. Wu
*Assistant Examiner*—Satya Sastri
(74) *Attorney, Agent, or Firm*—Brooks Kushman P.C.

(57) ABSTRACT

A process for reducing free aldehydes in dispersions, suspensions, emulsions and solutions which comprises including therein thioamine compound of the formula IV and optionally a thioamine of the formula III:

Formula III

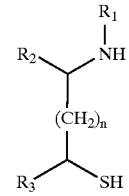

Formula IV

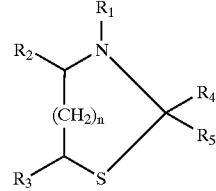

where $R_1$ is a $C_{1-5}$ alkyl radical, an aryl radical or hydrogen, $R_2$ is —$(COO)_a$—E or —$(CONH)_a$—E where a is 0 or 1 and E, $R_3$, $R_4$, and $R_5$ are independently $R_4$ and $R_5$ together containing at least one carbon atom, and n being 0 or 1.

19 Claims, No Drawings

REMOVAL OF FREE ALDEHYDES

BACKGROUND OF THE INVENTION

1. Field of the Invention

This invention relates to a process for removing free aldehydes from compositions containing them.

2. Background Art

Aldehydes, and especially formaldehyde, are known irritants. Furthermore, some aldehydes, for example formaldehyde and acetaldehyde, are considered possible carcinogens. The latter are among the most important industrial chemicals, are widely used and reacted, but are also inadvertently released.

Formaldehyde, for example, is frequently used in the production of woodbase materials as a phenol-formaldehyde resin or a melamine-formaldehyde resin. Woodbase materials employing such resins as adhesives or binders regrettably release formaldehyde into the environment after production. Owing to its high volatility, formaldehyde is also frequently to be found in the offgas of a variety of industrial processes. For example, when textiles are treated with formaldehyde derivatives such as dimethyloldihydroxyethyleneurea (DMDHEU) or other methylol-functional compounds, they will release a not inconsiderable portion of the chemically-bound formaldehyde into the environment as free formaldehyde. As a further example, houses built with formaldehyde-releasing materials may release formaldehyde into the rooms through the masonry. One method of addressing this problem is presented in DE 19809479 A1, which describes a method for remediating formaldehyde-polluted interiors through the use of sheep's wool.

Polymer dispersions are frequently prepared using formaldehydic compounds as fungicides, monomers or polymerization initiators. As a result, the ready-produced dispersion will contain major amounts of formaldehyde which can be released in later use. For example, it is known to use polymer dispersions as binders for consolidating and coating fibrous structures such as wovens, nonwovens and waddings comprised of textile fiber, textile yarns, or woodbase materials. The polymer dispersions are frequently copolymer dispersions of (meth)acrylate or vinyl ester copolymers which contain self-crosslinking comonomer units with N-methylol or N-methylol ether functions to improve strength. The copolymers customarily contain up to 10% by weight of units derived from N-methylol(meth)acrylamide (NMAA). A disadvantage of these binders is the release of formaldehyde due to hydrolytic cleavage of the N-methylol functionality.

Various strategies are proposed in the literature for reducing the level of free formaldehyde in polymer dispersions. These strategies generally utilize alternative, formaldehyde-free initiator systems, for example ascorbic acid. Such systems are capable of lowering the formaldehyde content by up to 80%, but have the disadvantage that they are very costly. The dispersions thus produced, however, can be produced and processed using conventional formulations and equipment.

EP-0778290 (U.S. Pat. No. 5,744,418) describes a process in which formaldehydic polymerizable initiator systems are replaced by aldehydes masked by bisulfite. When no HCHO-containing monomers are used, this leads to almost HCHO-free dispersions (<3 ppm HCHO).

U.S. Pat. No. 5,585,438, DE-A 3328456 (AU 8431608), U.S. Pat. No. 5,071,902, EP-A 0488605 (U.S. Pat. No. 5,143,954) and U.S. Pat. No. 5,326,814 disclose the use of N-methylolacrylamide as a crosslinker with conventional initiator systems, but with further addition of low molecular weight components as formaldehyde traps or acceptors to reduce free formaldehyde. The compounds chosen for use as formaldehyde traps react quickly and very quantitatively with formaldehyde to form harmless derivatives. Urea compounds, acetoacetates, dicyandiamide, and imidazoles have found application here. However, these formaldehyde scavengers work only over a limited pH range, lack stability in storage, or may have to be added in large quantities. Formaldehyde reductions of above 90% are achieved through use of such scavengers. The dispersions thus produced can likewise be produced and processed using conventional formulations and equipment. However, the scavenger may be responsible for adverse effects, for example discoloration in the course of the subsequent crosslinking or else an increased toxicity of the compounds added.

SUMMARY OF THE INVENTION

The present invention provides a process for reducing free aldehyde in aldehyde-containing or aldehyde-generating compositions without causing adverse consequences such as for example unpleasant odors, increased toxicity, or discoloration. These and other objects are surprisingly achieved by addition of thioamine compounds.

DETAILED DESCRIPTION OF THE PREFERRED EMBODIMENTS

The present invention accordingly provides a process for reducing free aldehydes in dispersions, suspensions, emulsions or solutions, which comprises including therein thioamines of the general formula I or II:

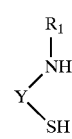

Formula I

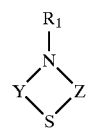

Formula II where Y and Z are each a divalent organic radical of at least two carbon atoms and $R_1$ is an organic alkyl or aryl radical of 1 to 15 carbon atoms or hydrogen, or mixtures thereof.

Preference is given to compounds of the formula III or IV or their salts or esters:

Formula III

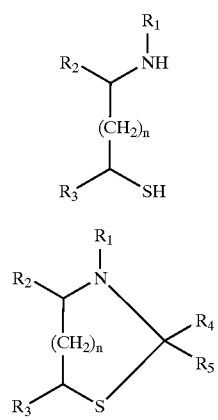

Formula IV where $R_1$ is an organic alkyl radical of up to 5 carbon atoms, an aryl radical, or hydrogen, $R_2$ is —$(COO)_a$—E or —$(CONH)_a$—E, where a is 0 or 1 and E is an organic radical of up to 10 carbon atoms or hydrogen, $R_3$ is a monovalent organic radical of up to 10 carbon atoms or hydrogen, $R_4$ and $R_5$ represent organic radicals of up to 10 carbon atoms or hydrogen and may be bonded to each other, subject to the proviso that $R_4$ and $R_5$ together must contain at least one carbon atom, and n is 0 or 1.

Particular preference is given to compounds of the formula III or IV or their salts or esters where $R_1$ is hydrogen or acetyl, $R_2$ is —COOH or hydrogen, $R_3$ is hydrogen, $R_4$ is hydrogen or methyl, $R_5$ is —COOH, —COOR, —$CH_2$—COOR, —$CH_2$—CN, optionally substituted aromatic, and n is 0 or 1.

These compounds include, for example but not by limitation, L-cysteine, D-cysteine, D,L-cysteine, N-acetylcysteine, cysteamine, homocysteine or their salts, esters or amides thereof and also their addition products (aminothioacetals or aminothioketals) with glyoxylic acid and pyruvic acid and their esters and amides, benzaldehyde, salicylaldehyde, vanillin, anisaldehyde, piperonal, acetophenone, cinnamaldehyde, citral, glucose, fructose, acetoacetate ester and acetylacetone. These naturally occurring amino acid derivatives are particularly safe toxicologically.

In the process according to the invention, free aldehyde present or being formed in dispersions, suspensions, emulsions or solutions is effectively bound by chemical reaction according to the general equation (1):

Equation (1)

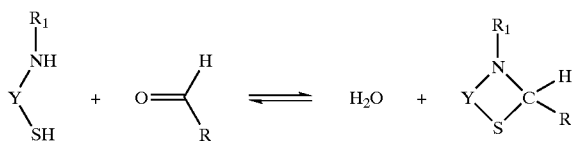

Surprisingly, the equilibrium of the reaction is distinctly on the side of the bound aldehyde even in the presence of water, so that this reaction can be used for removing aldehydes in water-containing systems. In this context, the compounds of the general formula I have the advantage that they are capable of binding aldehydes very quickly by chemical reaction. However, some of the compounds of the general formula I have the disadvantage that they are readily oxidizable (cysteine for example).

Permanent reduction of free aldehyde, for example in polymer dispersions, is thus not always attainable through use of compounds of the formula I, for example cysteine, alone. However, permanent reduction of free aldehydes is attainable by using compounds of the general formula II alone or in admixture with compounds of the general formula I. This is because compounds of the general formula II, being the stable storage form of compounds of the formula I, cannot be oxidized and can react with the free aldehyde as per the general equation (2):

Equation (2)

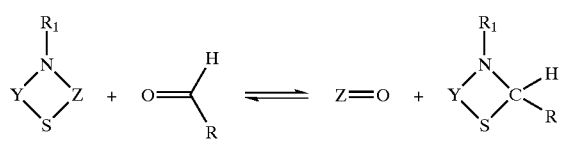

In addition to the bound aldehyde, the latter reaction produces a compound which is itself an aldehyde or ketone. However, these can be selected so that they have no unwanted odor, and/or are nontoxic. Representative examples are pyruvic acid and acetoacetate ester. The latter compound is especially advantageous in that it in turn can act as an additional aldehyde scavenger.

The process of the invention is generally useful for reducing aldehydes of the formula R—CHO, where R may be an organic alkyl or aryl radical of 1–20 carbon atoms or hydrogen. The process of the invention is more preferably used for reducing butyraldehyde, acetaldehyde, chloral and formaldehyde and most preferably for reducing formaldehyde.

The process of the invention is generally useful for reducing aldehydes in dispersions, suspensions, emulsions and solutions, preferably dispersions and suspensions, more preferably polymer dispersions and suspensions, and most preferably, polymer dispersions.

Free aldehyde is reduced according to the invention by using compounds of the general formula I or their salts, amides or esters, in an amount preferably between 0.002% by weight and 20% by weight, or compounds of the general formula II or their salts, amides or esters in an amount preferably between 0.002% by weight and 20% by weight, or mixtures thereof, each percentage by weight being based on the aldehydic dispersions, suspensions, emulsions or solutions for which aldehyde reduction is sought.

In a preferred embodiment, polymer dispersions are mixed with the thioamine compounds of the invention. The dispersions thus obtained are stable in that they comprise only very low levels of free aldehydes, for example formaldehyde, even after prolonged storage. The dispersions thus treated provide unimpaired crosslinking performance, nor are the compositions colored after crosslinking. An advantage is the simplicity of use of the inventive process, in that the thioamine compounds of the invention may simply be added as an aqueous solution to the ready-produced polymer dispersion.

The combination of amino acids with vinyl ester dispersions is disclosed in JP-A 1192612. In contrast to the process of the subject invention, the addition of amino acids is used to stabilize the resultant polymer dispersion in order that a sedimentation may be avoided, and requires the presence of an acetoacetate-functionalized polyvinyl alcohol as a very specific protective colloid. The dispersions used in the subject process according to the invention are, in contrast sufficiently stable even without addition of cysteine or acetoacetate-functionalized polyvinyl alcohols. Sedimentation stability was not observed to improve on using cysteine, but also did not have any adverse consequences for the sedimentation stability of the dispersions. JP-A 1192612 does not mention the formaldehyde content in the dispersion being lowered, although the use of acetoacetates as HCHO scavengers is common knowledge in the literature. The present invention provides formaldehyde reduction even without the use of acetoacetate-functionalized polyvinyl alcohols, by sole use of cysteine as an HCHO scavenger. Thus, in the present invention, it is desirable that the polymer dispersion be stable with respect to sedimentation prior to addition of the formaldehyde scavengers of the present invention. It is also preferable that the polymer dispersions be free of acetoacetate-functionalized polyvinyl alcohols.

The process according to the invention is particularly suitable for use in polymer dispersions or polymer suspensions containing one or more monomer units of vinyl esters of branched or unbranched carboxylic acids of 1 to 12 carbon atoms; esters of ethylenically unsaturated carboxylic acids, for example the esters of acrylic acid, methacrylic acid, maleic acid or fumaric acid with branched or unbranched alcohols of 1 to 12 carbon atoms; ethylenically unsaturated carboxylic acids; ethylenically unsaturated carboxamides; ethylenically unsaturated sulfonamides; styrenics; vinyl halides; alpha-olefins; or multiply ethylenically unsaturated compounds.

The vinyl ester copolymers or (meth)acrylic ester copolymers are preferably prepared by the emulsion polymerization process by known industrial processes. Useful dispersants include all emulsifiers and protective colloids customarily used in emulsion polymerization. The desired pH range for the polymerization, which is generally between 3 and 7, can be established in a known manner by means of acids, bases or customary buffer salts, such as alkali metal phosphates or alkali metal carbonates. Molecular weight reduction can be achieved in the polymerization by adding customary regulators.

Dispersions which have been admixed with thioalkylamines according to the process of the invention to reduce the level of free formaldehyde may be used to prepare dispersion powders. Dispersion powders are prepared by drying, preferably spray drying or freeze drying, most preferably spray drying, the dispersion. Conventional equipment is used, for example multi-component nozzles or disk sprayers dispensing into an optionally heated drying gas stream. The temperatures are generally not above 250° C. The best temperature for the drying gas can be determined routinely; temperatures above 60° C. have generally proven particularly useful.

The storability of powders having a low glass transition temperature (Tg) may be enhanced, and caking and blocking prevented, by adding antiblocking agents such as aluminum silicates, diatomaceous earth, or calcium carbonate, during the drying process. The dispersion may further include defoamers, for example silicone- or hydrocarbon-based defoamers, or atomizing aids, for example polyvinyl alcohols.

In preferred embodiments, the dispersion powders further contain up to 30% by weight, more preferably 1 to 15% by weight, based on base polymer weight, of a polyvinyl alcohol having a degree of hydrolysis of 85 to 94 mol %, and/or up to 10% by weight of vinyl alcohol copolymers containing 5 to 35% by weight of 1-methylvinyl alcohol units, and/or up to 30% by weight, more preferably 4 to 20% by weight, based on the total weight of polymeric constituents, of antiblocking agent and optionally up to 2% by weight, based on the base polymer, of defoamer.

Polymer dispersions or their powders incorporating the thioalkylamines of the invention may be used as compositions for coating aldehyde-emitting substrates, for example chipboard or materials of construction prepared therefrom. The coating may be effected directly or indirectly, for example by the dispersion being applied to a second substrate, and application or bonding to the formaldehyde-releasing substrate taking place before or after filming.

Aqueous solutions, for example wash solutions, can similarly incorporate the thioalkylamines of the invention in order to reduce aldehydes such as formaldehyde by, for example, washing textiles in these solutions, or by using such solutions to scrub aldehydic gases or gas mixtures, for example offgases.

In a further embodiment, emulsions as used for diverse applications, for example in the cosmetics industry, the pharmaceutical industry or the textile industry, may incorporate the thioalkylamines of the invention to reduce the level of undesirable aldehydes in these emulsions.

The examples below illustrate the invention, but should not be construed as limiting the scope of the invention.

EXAMPLE 1

A base dispersion based on vinyl acetate, ethylene, NMAA and butyl acrylate (EN 428 from Air Products Polymers) was admixed with 33 mmol of each of various compounds per liter of dispersion, and 2 hours later, the level of free formaldehyde in the dispersion was measured. The results are summarized in Table 1.

TABLE 1

| HCHO scavenger | Amount in mmol | Free HCHO in [ppm] after 2 h |
|---|---|---|
| — | — | 210 |
| Ethanolamine | 33 | 151 |
| Glucose | 33 | 207 |
| Sucrose | 33 | 210 |
| Urea | 33 | 173 |
| Ethanediol bisacetoacetate | 33 | 119 |
| Cysteine | 33 | 2 |

EXAMPLE 2

A (low-formaldehyde) base dispersion based on vinyl acetate, ethylene, NMAA and butyl acrylate (LL 1020 from Air Products Polymers) was admixed with 5 mol equivalents (based on formaldehyde) each of thioalkylamines or their derivatives and the level of free formaldehyde in the dispersion was measured after 0, 24 hours and 48 hours. The results are summarized in Table 2.

TABLE 2

| Derivative (5 mol equivalents) | HCHO content after 0 h [ppm] | HCHO content after 24 h [ppm] | HCHO content after 48 h [ppm] |
| --- | --- | --- | --- |
| Cysteine | 75 | 50 | 35 |
| 2-Methyl-2,5-thiazolidinedicarboxylic acid | 75 | 47 | 28 |
| 2-Methyl-2,5-thiazolidinedicarboxylic acid, Mg salt | 75 | 25 | 20 |

EXAMPLE 3

A base dispersion similar to Example 2 based on vinyl acetate, ethylene, NMAA and butyl acrylate (LL 1020 from Air Products Polymers) was admixed with various amounts (1 to 5 mol equivalents) of methylthiazolidinedicarboxylic acid and the level of free formaldehyde in the dispersion was measured after 0, 24, 48 and 168 hours. The results are summarized in Table 3.

TABLE 3

| Mol equivalents of HCHO scavenger | HCHO content after 0 h [ppm] | HCHO content after 24 h [ppm] | HCHO content after 48 h [ppm] | HCHO content after 168 h [ppm] |
| --- | --- | --- | --- | --- |
| 1 | 75 | 69 | 67 | 63 |
| 2 | 75 | 65 | 60 | 48 |
| 3 | 75 | 59 | 51 | 25 |
| 5 | 75 | 50 | 35 | 3 |

EXAMPLE 4

A base dispersion similar to Example 2 based on vinyl acetate, ethylene, NMAA and butyl acrylate (LL 1020 from Air Products Polymers) was admixed with 12.5 mmol (corresponding to 5 mol equivalents) of methylthiazolidenedicarboxylic acid (CP), its sodium salt (CP Na) and thiazolidinedicarboxylic acid (CG) and its sodium salt (CG Na) and the level of free formaldehyde in the dispersion was measured after 0, 1, 3, 7 and 20 days. The results are summarized in Table 4.

TABLE 4

| HCHO scavenger | HCHO content after 0 day [ppm] | HCHO content after 1 day [ppm] | HCHO content after 3 days [ppm] | HCHO content after 7 days [ppm] | HCHO content after 20 days [ppm] |
| --- | --- | --- | --- | --- | --- |
| CP | 75 | 48 | 15 | 2 | 3 |
| CP-Na | 75 | 29 | 15 | 2 | 3 |
| CG | 75 | 52 | 20 | 3 | 4 |
| CG-Na | 75 | 37 | 20 | 3 | 4 |

EXAMPLE 5

A base dispersion similar to Example 2 based on vinyl acetate, ethylene, NMAA and butyl acrylate (LL 1020 from Air Products Polymers) was admixed with 12.5 mmol (corresponding to 5 mol equivalents) of mixtures of methylthiazolidinedicarboxylic acid (CP) and thiazolidinedicarboxylic acid (CG) and also cysteine (C). The numbers preceding the abbreviations for the formaldehyde scavengers in the first column indicate the mole equivalent used, based on free formaldehyde. The level of free formaldehyde in the dispersion was measured after 0, 0.5, 2, 8 and 22 days. The results are summarized in Table 5.

TABLE 5

| HCHO scavenger | HCHO content after 0 day [ppm] | HCHO content after 0.5 day [ppm] | HCHO content after 2 days [ppm] | HCHO content after 8 days [ppm] | HCHO content after 22 days [ppm] |
| --- | --- | --- | --- | --- | --- |
| 4C + 1CP | 75 | 17 | 5 | 1 | 6 |
| 3C + 1CP | 75 | 30 | 4 | 4 | 11 |
| 5C + 1CG | 75 | 9 | 2 | 2 | 8 |
| 4C + 1CG | 75 | 16 | 4 | 6 | 19 |
| 4C + 2CP | 75 | 16 | 1 | 1 | 3 |

EXAMPLE 6

A base dispersion similar to Example 2 based on vinyl acetate, ethylene, NMAA and butyl acrylate (LL 1020 from Air Products Polymers) was admixed with 12.5 mmol (corresponding to 5 mol equivalents) of mixtures of cysteamine hydrochloride (CA) and homocysteine hydrochloride (HC) and also N-acetyloysteine (NAC). The level of free formaldehyde in the dispertion was measured after 0, 1, 2 and 5 days. The results are summarized in Table 6.

TABLE 6

| HCHO scavenger | HCHO content after 0 day [ppm] | HCHO content after 1 day [ppm] | HCHO content after 2 days [ppm] | HCHO content after 5 days [ppm] |
|---|---|---|---|---|
| CA | 75 | 15 | 9 | 4 |
| NAC | 75 | 34 | 34 | 36 |
| HC | 75 | 15 | 8 | 2 |

EXAMPLE 7

A base dispersion similar to Example 2 based on vinyl acetate, ethylene, NMAA and butyl acrylate (LL 1020 from Air Products Polymers) was admixed with 5 mol equivalents, based on free formaldehyde, of thiazolidinecarboxylic acids prepared by reaction of cysteine and substituted aldehydes/ketones. The level of free formaldehyde in the dispersion was measured after 0, 2, 5, and 12 days. The results are summarized in Table 7.

TABLE 7

| Aldehyde/ketone | HCHO content after 0 day [ppm] | HCHO content after 2 days [ppm] | HCHO content after 5 days [ppm] | HCHO content after 12 days [ppm] |
|---|---|---|---|---|
| Benzaldehyde | 75 | 9 | 14 | 17 |
| Vanillin | 75 | 4 | 2 | 1 |
| Isobutyraldehyde | 75 | 19 | 15 | 11 |
| Salicylaldehyde | 75 | 4 | 4 | 2 |
| Pivaldehyde | 75 | 11 | 4 | n.d.*) |
| Trifluormethyl-benzaldehyde | 75 | 2 | 1 | 0 |

*)not determinable

EXAMPLE 8

200 g of polyvinyl butyral (Pioloform BL 18 from Wacker Polymer Systems) having a butyraldehyde content of 256 ppm were resuspended in 800 ml of water. 560 mg of cysteine (5 mol equivalents) were then added and the suspension was stirred at 40° C. for 5 h. The polyvinyl butyral was then filtered off and the butyraldehyde in the solid was determined at 62 ppm. The aqueous filtrate was found to contain no detectable butyraldehyde, only the corresponding thiazolidine and residual cysteine.

EXAMPLE 9

500 ml of an aqueous dispersion based on vinyl acetate, ethylene and butyl acrylate (LL 489 from Wacker Polymer Systems) were admixed with 100 mg of acetaldehyde (200 ppm). 5 mol equivalents (based on acetaldehyde), i.e., 1.78 g of cysteine, were then added. The level of free acetaldehyde in the dispersion was measured after 2 days. It was found to be only 18 ppm.

EXAMPLE 10

50 ml of an aqueous (wash) solution containing 500 ppm of butyraldehyde were admixed with 4 mol equivalents, i.e., 268 mg of cysteine. The level of free butyraldehyde in the solution was measured after one day. It was found to be only 16 ppm.

EXAMPLE 11

50 ml of an aqueous (wash) solution containing 428 ppm of acetaldehyde were admixed with 4 mol equivalents, i.e., 375 mg of cysteine. The level of free acetaldehyde in the solution was measured after one day. It was found to be only 33 ppm.

EXAMPLE 12

50 ml of an aqueous (wash) solution containing 210 ppm of formaldehyde were admixed with 5 mol equivalents, i.e., 338 mg of cysteine. The level of free formaldehyde in the solution was measured after 1 week. It was found to be only 1 ppm.

EXAMPLE 13

50 ml of an aqueous (wash) solution containing 428 ppm of acetaldehyde were admixed with one mole equivalent, i.e., 94 mg of cysteine. The level of free acetaldehyde in the solution was measured after one day. It was found to be only 105 ppm. The level of free acetaldehyde in the solution after one week was found to be 132 ppm.

EXAMPLE 14

50 ml of an aqueous (wash) solution containing 428 ppm of acetaldehyde were admixed with one mole equivalent of cysteine and one mole equivalent of methylthiazolidinedicarboxylic acid (CP). The level of free acetaldehyde in the solution was measured after one day. It was found to be only 88 ppm. The level of free acetaldehyde in the solution after one week was found to be 87 ppm.

EXAMPLE 15

50 ml of an O/W emulsion (3.5% of fat) containing 500 ppm of acetaldehyde were admixed with 4 mol equivalents, i.e., 438 mg of cysteine. The level of free acetaldehyde in the emulsion was measured after one day. It was found to be only 38 ppm.

EXAMPLE 16

50 ml of an O/W emulsion (10% of fat) containing 500 ppm of acetaldehyde were admixed with 4 mol equivalents of cysteine and one mole equivalent of methylthiazolidinedicarboxylic acid (CP). The level of free acetaldehyde in the emulsion was measured after one day. It was found to be only 36 ppm. The level of free acetaldehyde in the emulsion after one week was found to be 35 ppm.

EXAMPLE 17

50 ml of an O/W emulsion (10% of fat) containing 200 ppm of formaldehyde were admixed with 4 mol equivalents of cysteine and one mole equivalent of methylthiazolidinedicarboxylic acid (CP). The level of free formaldehyde in the emulsion was measured after one week. It was found to be only 1 ppm. The level of free formaldehyde in the emulsion after 4 weeks was found to be 1 ppm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for reducing free aldehydes in a polymer dispersion, polymer suspension, polymer emulsion, polymer solution, or aqueous fat emulsion for which aldehyde reduction is desired, the process comprising incorporating into said polymer dispersion, polymer suspension, polymer emulsion, polymer solution, or aqueous fat emulsion a thioalkylamine of the formula IV, optionally in admixture with one or more thioalkylamines of the formula III:

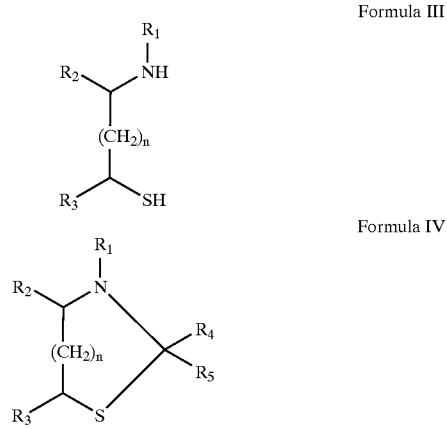

where $R_1$ is an alkyl radical of up to 5 carbon atoms, an aryl radical, or hydrogen, $R_2$ is —(COO)$_a$—E or —(CONH)$_a$—E, where a is 0 or 1 and E is an organic radical of up to 10 carbon atoms or hydrogen, $R_3$ is a monovalent organic radical of up to 10 carbon atoms or hydrogen, $R_4$ and $R_5$ represent organic radicals of up to 10 carbon atoms or hydrogen and may be bonded to each other, subject to the proviso that $R_4$ and $R_5$ together must contain at least one carbon atom, and n is 0 or 1, wherein said thioaklylamines of formulae III and IV may be present in the form of their respective salts and/or esters.

2. The process of claim 1, wherein the salts and/or esters of the compounds of the general formulae III or IV are employed as said thioalkylamines.

3. The process of claim 1, wherein at least one compound of the formula III or IV, their salts, or esters, where $R_1$ is hydrogen or acetyl, $R_2$ is —COOH or hydrogen, $R_3$ is hydrogen, $R_4$ is hydrogen or methyl, $R_5$ is —COOH, —COOR, —CH$_2$—COOR, —CH$_2$—CN, or optionally substituted aromatic, and n is 0 or 1 are employed as said thioalkylamine.

4. The process of claim 1, wherein said thioalkylamine comprises a thioamino acid selected from the group consisting of L-cysteine, D-cysteine, D,L-cysteine, N-acetylcysteine and homocysteine; a salt, ester, or amide of one of said thioamino acids; or an addition product of one of said thioamino acids with at least one compound selected from the group consisting of glyoxylic acid, an ester of glyoxylic acid, an amide of glyoxylic acid, pyruvic acid, an ester of pyruvic acid, an amide of pyruvic acid, benzaldehyde, salicylaldehyde, vanillin, anisaldehyde, piperonal, acetophenone, acetoacetate ester, acetylacetone, cinnamaldehyde, citral, glucose, and fructose.

5. The process of claim 1, wherein said thioalkylamines, their salts, amides or esters are used in an amount between 0.002% by weight and 20% by weight based on the weight of the dispersion, suspension, emulsion or solution.

6. The process of claim 1, wherein aldehydes of the formula R—CHO, where R is an organic alkyl or aryl radical of 1–20 carbon atoms or hydrogen are removed from said composition.

7. The process of claim 1, wherein acetaldehyde, butyraldehyde, chloral or formaldehyde are removed from said composition.

8. The process of claim 1, wherein said composition for which aldehyde reduction is desired comprises a dispersion or a suspension wherein the polymer of said polymer dispersion or said polymer suspension comprises a vinyl acetate polymer or copolymer.

9. The process of claim 1, wherein said composition for which aldehyde reduction is desired comprises a polymer dispersion or a polymer suspension.

10. The process of claim 1, wherein free aldehydes are reduced in a polymer dispersion or a polymer suspension, said polymer containing one or more monomer units comprising vinyl esters of branched or unbranched carboxylic acids of 1 to 12 carbon atoms, monomer units comprising esters of ethylenically unsaturated carboxylic acids with branched or unbranched alcohols of 1 to 12 carbon atoms, monomer units comprising ethylenically unsaturated carboxylic acids, monomer units comprising ethylenically unsaturated carboxamides, monomers units comprising ethylenically unsaturated sulfonamides, monomer units comprising styrenics, monomer units comprising vinyl halides, monomers units comprising alpha-olefins, or monomer units comprising multiply ethylenically unsaturated compounds.

11. A process for reducing free aldehydes emitted from an aldehyde-emitting substrate, comprising coating said substrate with a suspension, dispersion, emulsion, or solution, or with a powder obtained by drying a dispersion, said suspension, dispersion, emulsion, solution, and powder containing a thioalkylamine of the formula IV optionally in admixture with one or more thioalkylamines of the formula III:

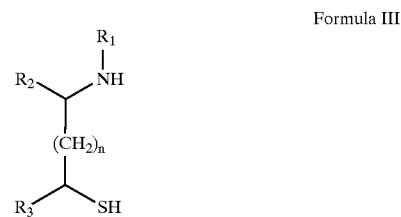

-continued

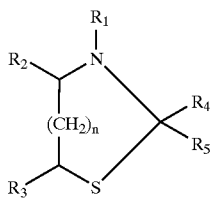

Formula IV where $R_1$ is an alkyl radical of up to 5 carbon atoms, an aryl radical, or hydrogen, $R_2$ is —$(COO)_a$—E or —$(CONH)_a$—E, where a is 0 or 1 and E is an organic radical of up to 10 carbon atoms or hydrogen, $R_3$ is a monovalent organic radical of up to 10 carbon atoms or hydrogen, $R_4$ and $R_5$ represent organic radicals of up to 10 carbon atoms or hydrogen and may be bonded to each other, subject to the proviso that $R_4$ and $R_5$ together must contain at least one carbon atom, and n is 0 or 1.

12. The process of claim 11, wherein the substrate is treated by direct application, indirect application or by application after filming.

13. The process of claim 11, wherein the substrate is a textile, gas, or gas mixture.

14. The process of claim 11, wherein the aldehyde is acetaldehyde, butyraldehyde, chloral or formaldehyde.

15. The process of claim 1, wherein the composition for which aldehyde reduction is desired is a polymer dispersion or redispersible polymer powder prepared therefrom, said polymer dispersion stable with respect to sedimentation prior to addition of said thioalkylamine.

16. The process of claim 1, wherein the composition for which aldehyde reduction is desired is a polymer dispersion or redispersible polymer powder prepared therefrom, said polymer dispersion free of acetoacetate-functionalized polyvinyl alcohol.

17. The process of claim 1, wherein said composition for which aldehyde reduction is desired is not a polymer dispersion or a redispersible powder prepared therefrom.

18. An aqueous polymer dispersion having a reduced content of aldehydes, said polymer dispersion prepared by treating said aqueous polymer dispersion by the process of claim 1.

19. A redispersible polymer powder of reduced aldehyde content, prepared by spray drying the aqueous polymer dispersion of claim 18.

* * * * *